(12) United States Patent
Daniel

(10) Patent No.: US 9,466,060 B1
(45) Date of Patent: Oct. 11, 2016

(54) SYSTEM AND METHOD FOR VALIDATING IDENTITY FOR INTERNATIONAL USE OF AN ELECTRONIC PAYMENT CARD

(71) Applicant: Isaac S. Daniel, Miramar, FL (US)

(72) Inventor: Isaac S. Daniel, Miramar, FL (US)

( * ) Notice: Subject to any disclaimer, the term of this patent is extended or adjusted under 35 U.S.C. 154(b) by 494 days.

(21) Appl. No.: 13/769,439

(22) Filed: Feb. 18, 2013

Related U.S. Application Data

(60) Provisional application No. 61/600,411, filed on Feb. 17, 2012, provisional application No. 61/696,045, filed on Aug. 31, 2012.

(51) Int. Cl.
  *G06F 19/00* (2011.01)
  *G06Q 20/40* (2012.01)

(52) U.S. Cl.
  CPC .................................. *G06Q 20/409* (2013.01)

(58) Field of Classification Search
  CPC .... G07F 19/20; G07F 19/203; G06K 7/1008
  USPC .......................... 235/379, 380, 382, 486, 492
  See application file for complete search history.

(56) References Cited

U.S. PATENT DOCUMENTS

| | | | | |
|---|---|---|---|---|
| 5,402,095 | A * | 3/1995 | Janniere | 235/441 |
| 7,360,688 | B1 * | 4/2008 | Harris | 235/380 |
| 8,127,983 | B1 * | 3/2012 | Block et al. | 235/379 |
| 8,444,053 | B2 * | 5/2013 | Harris | 235/380 |
| 2004/0117514 | A1 * | 6/2004 | Nelms | A45C 11/182 710/1 |
| 2005/0053264 | A1 | 3/2005 | Amano et al. | |
| 2005/0077348 | A1 | 4/2005 | Hendrick | |
| 2005/0247797 | A1 | 11/2005 | Ramachandran | |
| 2009/0015371 | A1 | 1/2009 | Bocquet et al. | |
| 2009/0150294 | A1 | 6/2009 | March et al. | |
| 2010/0071031 | A1 | 3/2010 | Carter et al. | |

OTHER PUBLICATIONS

Office Action, U.S. Appl. No. 14/017,191 dated Feb. 20, 2015.

* cited by examiner

*Primary Examiner* — Daniel St Cyr
(74) *Attorney, Agent, or Firm* — Carol N. Green Kaul, Esq.

(57) ABSTRACT

The present invention is directed to a system and method for validating a cardholder's identity for international use of an electronic debit card to perform banking transactions, comprising of: an international payment card configured for electronically storing thereon a biometric identifier; biometric verification means positioned on the international payment card, wherein the biometric verification means is configured for validating the cardholder's biometric sample with the biometric identifier stored on the international payment card; and an electronic card case including location determining means disposed within, operative for orienting itself and determining the absolute location of the electronic card case upon activation by the insertion and retaining of the international payment card, and communication means for electronically notifying the issuing bank of the absolute location of the electronic card case as determined, thereby facilitating authorization for international use of the international payment card.

30 Claims, 9 Drawing Sheets

US 9,466,060 B1

SYSTEM AND METHOD FOR VALIDATING IDENTITY FOR INTERNATIONAL USE OF AN ELECTRONIC PAYMENT CARD

PRIORITY CLAIM

This patent application is a Continuation-in-Part patent application and claims priority under 35 U.S.C. §119(e), to U.S. Provisional Patent Application Ser. No. 61/600,411 titled "A System And Method For Validating Identity For International Use Of A Debit Card" filed Feb. 17, 2012 and U.S. Provisional Patent Application Ser. No. 61/696,045 titled "An Apparatus, System And Method For Validating Authorization For International Use Of A Credit Card" filed Aug. 31, 2012. The entire disclosures of the afore-mentioned patent applications are incorporated by reference as if fully stated herein.

FIELD OF THE INVENTION

The present invention is directed to a system and method for validating a cardholder's identity for performing international financial transactions, comprising of: an international payment card configured for electronically storing thereon a biometric identifier; biometric verification means positioned on the international payment card, wherein the biometric verification means is configured for validating the cardholder's biometric sample with the biometric identifier stored on the international payment card; and an electronic payment card case including location determining means disposed within, operative for orienting itself and determining the absolute location of the electronic card case upon activation by the insertion and retaining of the international payment card, and the electronic card case including communication means for electronically notifying the issuing bank of the absolute location of the electronic card case as determined, thereby facilitating authorization for international use of the international payment card.

BACKGROUND OF THE INVENTION

When travelling internationally, many debit/credit card holders would like to use their cards to conduct financial transactions abroad. However, banks are very cautious and are concerned about fraud and their inability to recoup for fraudulent international losses. This results in banks exercising strict controls including placing a daily allowance or transaction limit on the cardholder's accounts. Notwithstanding these controls, some banks require their cardholders to notify the bank of upcoming international use and/or make prior arrangements for extending their daily allowance or transaction limit prior to leaving the resident country. Some banks have even more onerous restrictions and require additional in-person identity verification, which may include vigorous questioning and communication with the domestic bank prior to allowing financial transactions of a substantial amount in a foreign country even if the funds are available in the account. The issuing bank's argument being that such controls are in place to protect the cardholder's account from fraudulent transactions.

However, the time difference between the resident country and abroad can wreak havoc in trying to accomplish a financial transaction in a timely manner considering all the identity verification and international calls required prior to the transaction being authorized. Thus, there needs to be a system and method for easily validating the identity of a debit/credit cardholder for international use of an electronic data card for financial transactions that is easy, with minimal inconvenience to the cardholder, yet secure.

Accordingly, the various embodiments and disclosures described herein satisfy these long felt needs and solves the limitations of the prior art in a new and novel manner.

BRIEF DESCRIPTION OF THE DRAWINGS

Further objectives and advantages of the system and method may be derived by referring to the detailed description and claims when considered in connection with the Figures, wherein like reference numbers refer to similar items throughout the Figures.

DETAILED DESCRIPTION OF THE PREFERRED EMBODIMENT

System Level Overview

Figure 1A:
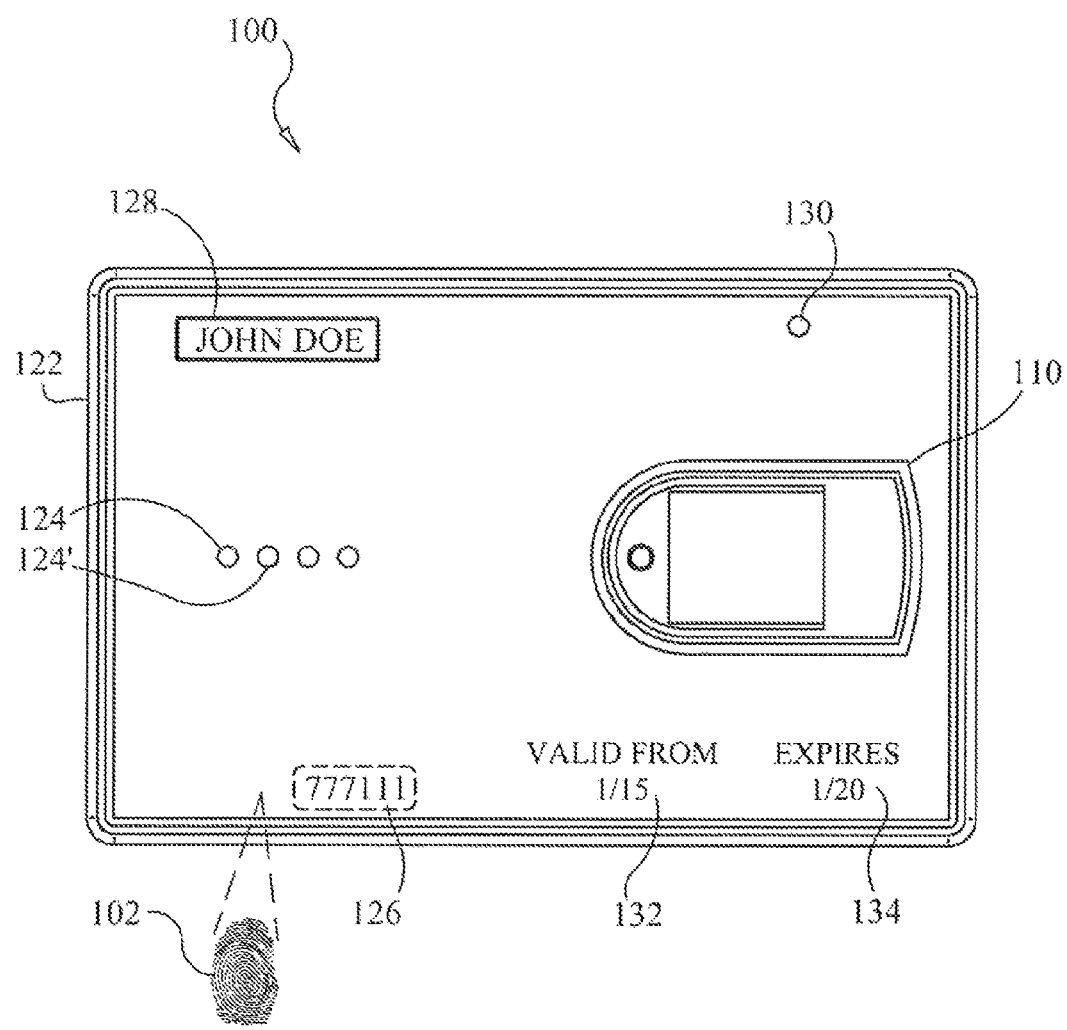
FIG. 1A is an exemplary embodiment of the international payment card according to one embodiment.

The following discussion describes in detail, varied embodiments of the system and methods disclosed herein. However, this discussion should not be construed, as limiting the invention to those particular embodiments, as practitioners skilled in the art will appreciate that the system may vary as to configuration and as to details of the parts, and that a method may vary as to the specific steps and sequence, without departing from the basic concepts as disclosed herein. Similarly, the elements described herein may be implemented separately, or in various combinations without departing from the teachings of the present invention. Turning now descriptively to the drawings, in which similar reference characters denote similar elements throughout the various views.

Figure 1B:
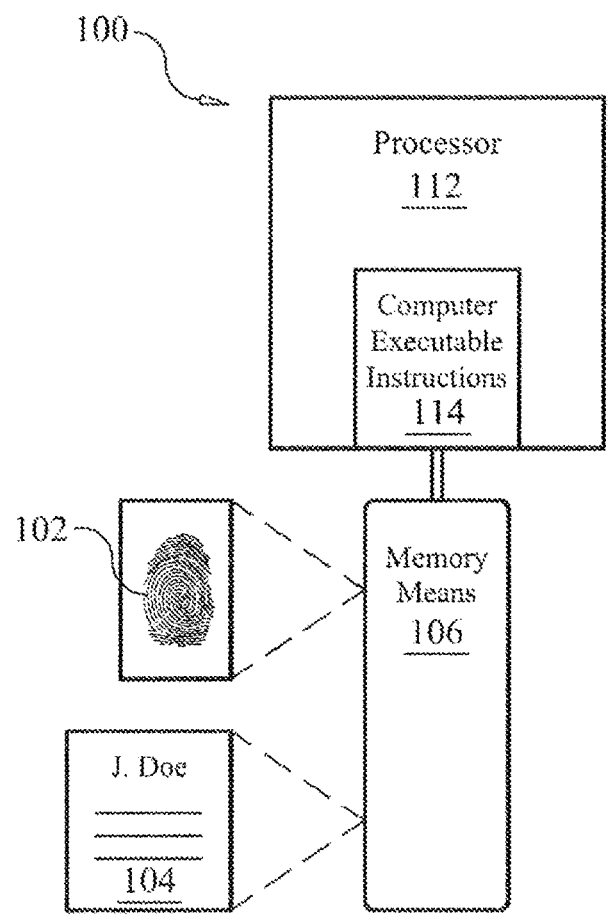
FIG. 1B is an exemplary embodiment of the international payment card according to one embodiment.
Figure 1C:
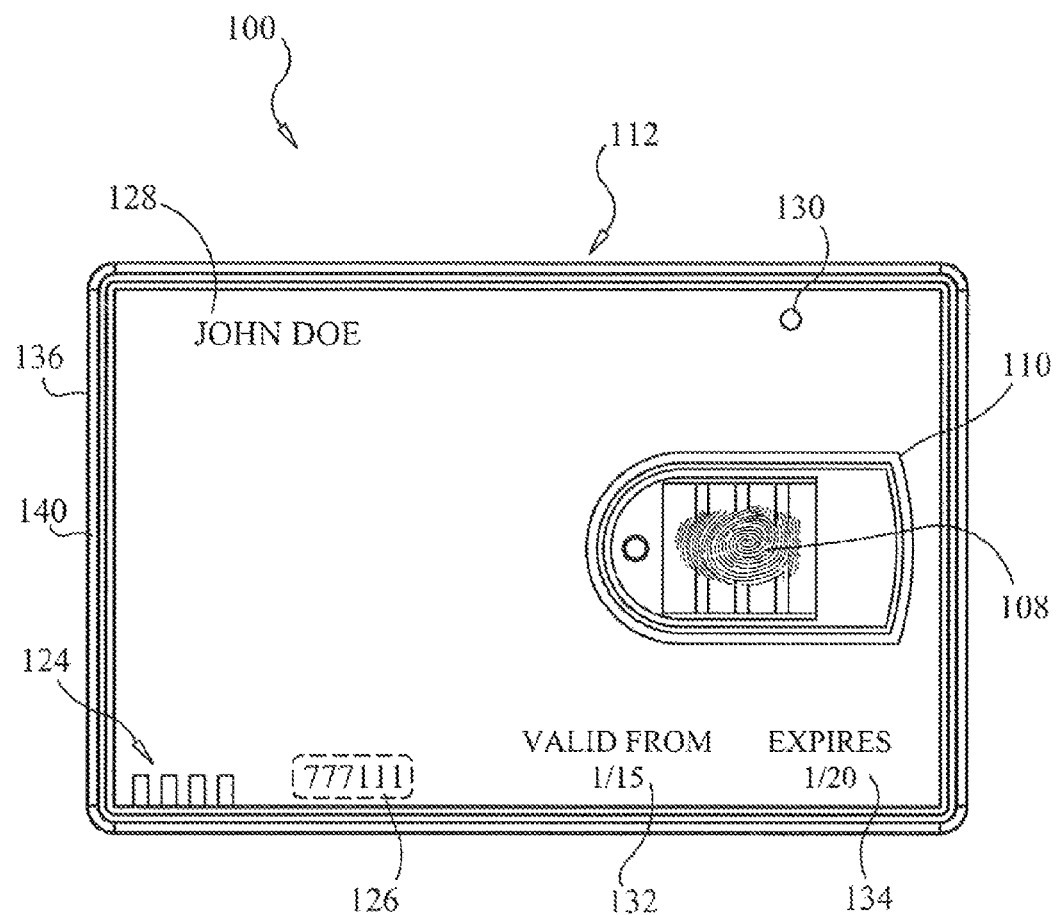
FIG. 1C is an exemplary embodiment of the international payment card according to one embodiment.

FIGS. 1A, 1B & 1C are exemplary embodiments of the international debit/credit card (hereinafter "international payment card") 100. The international payment card 100, i.e. an electronic data card, is a functional component of the system of the invention and is configured for storing thereon any one or more of the following: a biometric identifier 102, cardholder's information 104 and the like. International payment card 100 is selected from the group of electronic devices consisting essentially of programmable smart cards, memory cards, and processor cards, with at least one memory means 106 embedded therein configured for storing any one or more of the following: a biometric identifier 102 and/or the international payment cardholder's information 104. Cardholder's information 104 as used herein includes any one or more of the following: cardholder's name, address, pre-approved status to participate in this system and method, country of domicile, date of birth, contact information, and the like. Other data that may be stored thereon may include issuing bank's information, cardholder's account information, biometric identifier 102 and the like.

Upon issuance of the international payment card 100 and prior to use (domestic or international use), a biometric sample 108 is obtained from cardholder and enrolled as a biometric identifier 102, which may be stored on the international payment card 100 or the issuing bank for future reference and comparison. Biometric identifier 102 as used herein describes a stored biometric sample 108 that uniquely identifies the individual based on his/her intrinsic physical traits, e.g. fingerprints, retina scan, palm geometry, hand geometry, speech, and or other biometric identifiers 102, 102' that are used in the arts.

International payment card 100 also includes biometric verification means 110 positioned on the international payment card 100, configured for validating a cardholder's biometric sample 108 by comparing the biometric sample 108 with the biometric identifier 102. Biometric verification means 110 includes but is not limited to: fingerprint recognition means, hand geometry recognition means, palm geometry recognition means, iris recognition means, retina recognition means, speech recognition means and any other biometric verification means 110 that are known and used in the arts. Biometric verification means 110 may include at least one processor 112 positioned within the international payment card 100 and disposed in communication with, for example, a fingerprint scanner, hand geometry scanner, a palm geometry scanner, iris scanner, retina scanner, or a user interface, which may include an audio receiving circuit capable of receiving audio signals at predetermined frequencies and/or with additional hardware, complete with electronic circuitry and such other biometric verification means 110 that are known and used in the arts. Illustratively, as seen in FIG. 1A, the biometric verification means 110 includes a fingerprint scanner, where the card's processor 112 controls the functionality of the fingerprint scanner, generating the varied algorithms for storage of the first valid biometric sample 108 as a biometric identifier 102 and validates the images of subsequent biometric samples 108, 108' received from the cardholder.

Although in some embodiments, the international payment card 100 does not include a processor 112, generally the international payment card 100 includes at least one processor 112 positioned within. Processor 112 may be any type of processor 112, such as, but not limited to, a central processing unit (CPU), a microprocessor, a video processor, a front end processor, a coprocessor, a single-core processor, a multi-core processor, as well as any known processor 112 that's used in the arts.

As shown in FIG. 1B, in some embodiments, embedded within the processor 112 are computer executable instructions 114 readable by the card's at least one processor 112 where the computer executable instructions 114 are operative to perform the varied system functions of the international payment card 100. Computer executable instructions 114 may be any type of computer executable instructions 114, which may be in the form of a computer program, the program being composed in any suitable programming language or source code, such as C++, C, JAVA, JavaScript, HTML, XML, and other programming languages. The card's at least one processor 112 is configured for performing any one or more of the following: validating a biometric sample 108 with a biometric identifier 102 stored on the international payment card's at least one memory means 106; and communicating with a computer 116 via an application program 118.

Figure 2:
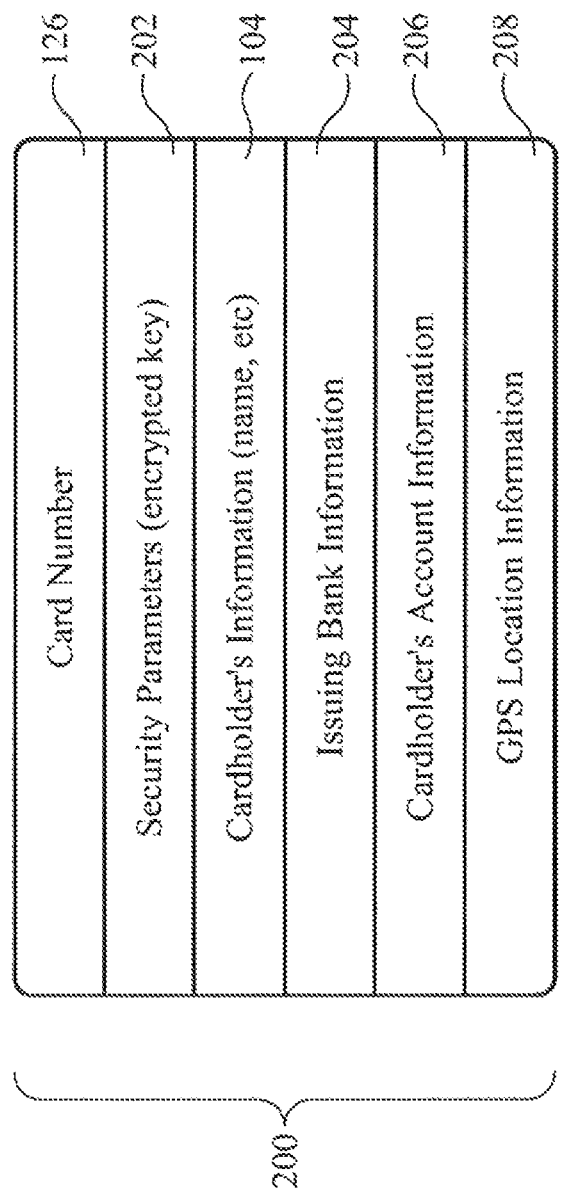
FIG. 2 illustrates, by way of example, collectively the data structures stored within an embodiment of the international payment card.

In some embodiments, international payment card 100 includes at least one memory means 106 as exemplified in FIG. 1B. Such memory means 106 may include a hardware component, e.g. storage hardware, in electrical communication with at least one processor 112. Storage hardware may include, but is not limited to, read-only memory, such as CD-ROMs, DVDs, floppy disks, and the like, read and write memory, such as a hard drive, floppy disc, CD-RW, DVD-RW, solid state memory, such as solid state hard drives, flash cards, memory chips, and the like, and random access memory. In one embodiment, the at least one memory means 106 may comprise of both hardware and software components. Memory means 106 may include any one or more of the following stored thereon: a biometric sample 108, biometric identifier 102, cardholder's information 104, and/or other data structures 200 (as shown in FIG. 2) components. In some embodiments, at least one memory means 106 may be embedded within at least one processor 112 where the information stored therein is encrypted for privacy purposes. In other embodiments, the at least one memory means 106 is adapted with electrical contacts for establishing wired and/or wireless connectivity with external devices, e.g. a computer 116 and/or a card reader 120 via for example a microchip and/or at least one microprocessor 112 where the memory means 106 is embedded within.

In some embodiments, international payment card 100 may optionally include a battery 122, which serves as a power source for the at least one processor 112 positioned therein. In some embodiment, international payment card 100 is adapted with electrical contacts 124, 124' for establishing wired and/or wireless connectivity to a card reader 120 or a charger, e.g. a docking station, and as such may not include a battery 122. In that event, processor 112 detects when the international payment card 100 has been disconnected from an external power source and switches international payment card power source to an internal power source, such as the battery 122.

FIG. 1C is an exemplary embodiment of the international payment card 100. In some embodiments, international payment card 100 may include a card number 126, which acts as a unique identifier for the international payment card 100 and/or cardholder. Card number 126 may be assigned by a random number generating program, comprising of numerals, characters, alphanumeric characters or any other unique identifiers that are known and used in the arts. Prior to being issued to the cardholder, the international payment card number 126 may be recorded as another means of identifying the cardholder. International payment card 100 may also include other indicia of identification, e.g. the international payment cardholder's name 128. In some embodiments, the cardholder's address may be stored within the international payment card's memory means 106.

Cardholder's identity may also be verified to the appropriate authorities using the biometric verification means 110 stored thereon. For example, in instances where the biometric verification means 110 includes a fingerprint scanner, cardholder may submit a biometric sample 108 using the same finger previously used to obtain the first valid biometric sample 108 stored thereon as the biometric identifier 102. If the biometric sample 108 matches the biometric identifier 102, the card's at least one processor 112, which is disposed in communication with the fingerprint scanner, may activate a display means 130, which may include a Light Emitting Diode ("LED") display to show for example a green light.

As such, cardholder is free to proceed with the international payment transaction in a foreign country without further authentication as to his/her identity. This negates the necessity of lengthy telephone calls to authenticate the cardholder, which can be cumbersome, costly and inefficient when dealing with two different time zones.

In some embodiments, where the biometric sample 108 is invalid and fails to match the biometric identifier 102 stored thereon, the display means 130 may display a red light. Most likely, cardholder is given another opportunity(ies) to resubmit his/her biometric sample 108 as long as a predetermined limit for submitting biometric samples 108, 108' has not been exceeded to the extent such predetermined limit exists. If notwithstanding the opportunity to submit a valid biometric sample 108, cardholder's in person biometric sample 108 fails to match the biometric identifier 102 stored on the international payment card 100 and the limit has been exceeded, the financial institution or merchant may initiate the appropriate fraud prevention protocol to confirm the cardholder's identity, which may include contacting the issuing banking, declining the payment transaction or other fraud prevention measures.

FIG. 2 illustrates, by way of example, collectively the data structures 200 stored within according to an embodiment of the international payment card 100. Data structures 200 are retained within the electronic data card's memory means 106, which preferably provides sufficient processing resources to facilitate communication and maintain adequate security for the card 100. Data structures 200 include but is not limited to: card number 126, security parameters 202, cardholder's information 104, issuing bank's information 204 e.g. contact information, authorized Automated Teller Machines ("Atms"), cardholder's account information 206 and in some embodiments Global Positioning System ("GPS") location information 208. Card number 126 may act as a unique identifier allowing the system to uniquely recognize and register each international payment card 100 that has been assigned and issued to individual cardholders. Security parameters 202 may be provided, that may include an encrypted key(s) of military grade, and or security codes, biometric security features, and/or other security mechanisms for maintaining the confidentiality of the data structures 200 stored on the card 100.

Cardholder's information 104 may be stored thereon, which include but is not limited to cardholder's name, address, pre-approved status to participate in this system and method, country, date of birth, contact information, and the like. It will be understood that access to the cardholder's information 104 may be provided in a hierarchical form associated with security provisions to protect the confidentiality of the information stored on the international payment card 100.

Issuing bank information 204 may include for example an issue date 132 that corresponds to the date the international payment card 100 was issued to the cardholder, and/or card expiration date 134, which corresponds to the date the international payment card 100 expires. Account information 206 may contain information regarding the type of bank account, e.g. checking, savings, commercial or retirement accounts, etc., and/or any fees associated with the account, available balances and the like.

In some embodiments, the international payment card 100 may include GPS location determining means 136, e.g. a GPS transponder, for determining the absolute location 138 of the international payment card 100 with means for encoding 140 the absolute location 138, i.e. the longitude and latitude co-ordinates, into an electronic signal 142 using e.g. a processor 112, e.g. a microprocessor, which is transmitted to the remote issuing bank's computer 116 where the transmitted electronic signal 142 is geocoded to convert the electronic signal 142 into an address, for the location of the international payment card 100 and cardholder's use activity may be monitored in real-time. Therefore, the absolute location 138 of the international payment card 100 and by extension the cardholder's foreign location may be determined in real-time via global satellite system and may be stored in the GPS location information 208.

Figure 3:
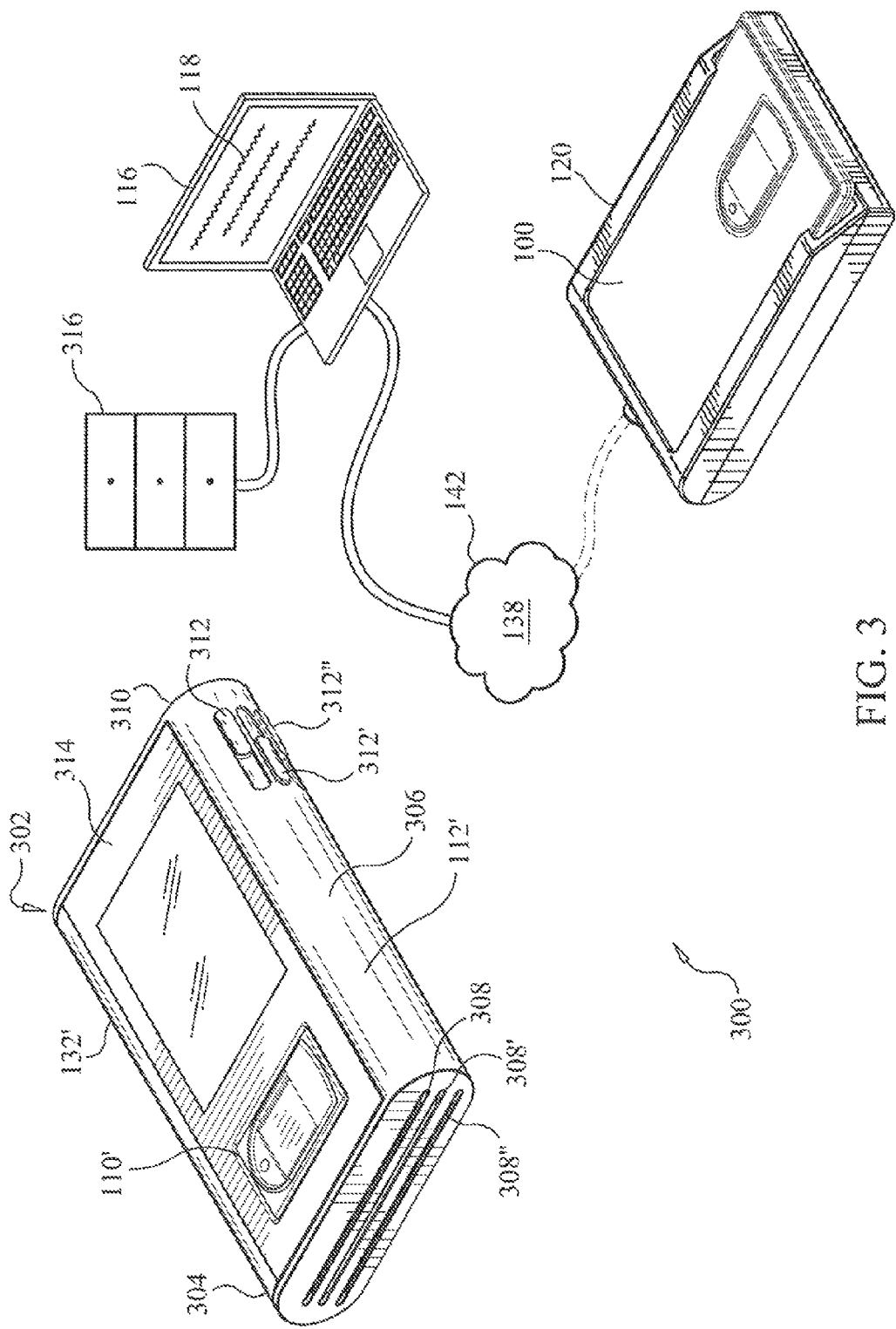
FIG. 3 shows an exemplary system in accordance with one embodiment.

FIG. 3 is an exemplary system 300 in accordance with one embodiment. System 300 comprises of the international payment card 100, i.e. an electronic data card, configured for electronically storing thereon a biometric identifier 102; biometric verification means 110 positioned on the international payment card 100, wherein the biometric verification means 110 is configured for validating a cardholder's biometric sample 108 by comparing the biometric sample 108 with the biometric identifier 102 stored on the international payment card 100. In this manner, the international payment card 100 is rendered useless if stolen as the international payment card 100 cannot be used to identify anyone other than the individual cardholder to whom the international payment card 100 was issued. International payment cardholder's identity may be further verified, e.g. in the presence of authorities at e.g. a merchant's office or an international branch, whereby cardholder may be required to submit a new biometric sample 108 using the biometric verification means 110 positioned thereon. Here too, the biometric sample 108 will be compared to the biometric identifier 102 either stored on the international payment card 100, or with the issuing bank. International payment card 100 is configured for being accessed by the application program 118 executable on a computer 116, automatically providing for example at least one or a plurality of the cardholder's information 104 stored thereon in response to a request for at least one or a plurality of the cardholder's information 104 when read by a card reader 120.

System 300 also comprises of an electronic payment card case 302 that includes location determining means 136' disposed within, operative for orienting itself and determining the electronic card case's absolute location 138' upon activation by the insertion and retaining of the international payment card 100, and wherein the electronic payment card case 302 also includes communication means 304 for electronically notifying the issuing bank's computer 116 of the electronic card case's absolute location 138' or the international payment card 100 as determined. In some embodiments, the electronic notification to the issuing bank of the absolute location 138 of the international payment card 100 may also be performed by the international card reader 120.

As shown in FIG. 3, electronic card case 302 may include biometric verification means 110' positioned thereon, (similar in configuration and function as the international payment card's biometric verification means 110), for authenticating the cardholder's identity. Electronic card case 302 comprises of a rigid exterior 306 with one or more slots 308, 308', 308" dimensioned to receive and fit as many international payment cards 100, 100', 100" as there are slots 308, 308', 308" within the electronic card case 302, and provides for a preauthorization electronic notification to be sent to an issuing bank's computer 116 alerting the issuing bank of a proposed financial transaction to be transacted using the international payment card 100 in an identified foreign country prior to the international payment card 100 being actually used. Upon issuance and prior to first use (including domestic use), cardholder will need to register a valid biometric sample 108', which gets saved as a biometric identifier 102'. Because the biometric identifier 102' as registered is unique to the cardholder, even if the electronic card case 302 is lost with the international payment cards 100, 100', 100" stored within, the international payment cards 100, 100', 100" will remain unauthorized for international use.

Electronic card case 302 includes a release and retain mechanism (hereinafter "release mechanism") 310 such as those that are well known and used in the arts to retain and/or release an object and may include any one of the following push latch, thermo-magnetic push latch, electromagnetic push latch, magnetic push latch, spring-loaded levers, and the like. In an exemplary embodiment, the electronic card case's release mechanism 312 includes release buttons 314, 314' that may be positioned on the external cover 316 such that when depressed, the other components of the release mechanism 312 that are positioned within the electronic card case 302 allow the credit card 106 within the slot 310 for which the corresponding release button 314 was depressed to be released from the electronic card case 302 for use.

Electronic card case 302 includes GPS location determining means 136', e.g. a GPS transponder, for determining the absolute locations 138', 138 of the electronic card case 302 and/or the international payment card 100, with means for encoding 140' the absolute locations 138, 138' into electronic signals 142, 142' using e.g. a processor 112', e.g. a microprocessor, which is transmitted to the issuing bank, where for example the transmitted electronic signals 142, 142' are decoded and the electronic card case's absolute location 138' and/or the international payment card's absolute location 138 are monitored, updated and the international payment card 100 is authorized for international transactions in real-time. As such, the absolute locations 138, 138' of the international payment card 100 and/or the electronic card case 302 may be determined in real-time for consistency via global satellite system, where the cardholder's location (e.g. geocoded address including foreign country) may be stored in the GPS location information 208.

In some embodiments, the electronic card case 302 includes at least one processor 112' positioned within. Processor 112' may be any type of processor 112', such as, but not limited to, a central processing unit (CPU), a microprocessor, a video processor, a front end processor, a coprocessor, a single-core processor, a multi-core processor, as well as any known processor 112' that's used in the arts.

Electronic card case 302 includes communication means 304 that may include but is not limited to BLUETOOTH®, ZIGBEE™, 802.11 series, or any other short range wireless protocol that are well known and used in the arts and/or other future short range wireless protocol suitable for transmitting data over a computer wireless network. Communication means 304 include both transmitting and receiving means, which may comprise of a combined wireless transceiver with integrated radio and shared antennae, e.g. WiHLoN™, BLUE TOOTH®, ZIGBEE™, 802.11 series, or any other short range wireless protocol that is well known and used in the arts. Preferably, the communication means 304 include one or more combined wireless transceivers like a ZIGBEE and/or BLUETOOTH® transceiver with integrated radio and shared antennae wherein in some embodiments are in mating engagement with an autonomous power source, e.g. a rechargeable battery. Communication means 304 are operative for transmitting the location encoded signals 142, 142', which include the encoded absolute locations 138', 138 of the electronic card case 302 and/or the international payment card 100 to the issuing bank's remote computer server 116, which updates the cardholder's location information ultimately affects his/her authorization to use the international payment card 100 in that foreign country. In some embodiments, the international payment card 100 also includes communication means 304' for transmitting its absolute location 138 to the issuing bank.

System 300 further comprises of a card reader 120 connected to a computer 116, wherein the card reader 120 is configured for reading the international payment card 100 for verifying the cardholder's pre-approval for international payment transactions with the international payment card 100. Card reader 120 describes an electronic device for scanning and reading electronic data cards, e.g. the international payment card 100 via an exemplary magnetic strip to obtain electronic information stored thereon as are well known and used in the arts. Card reader 120 is connected to a computer 116 either wirelessly or wired, wherein card reader 120 is configured for scanning and reading any one or more of the following: the international payment card number 126, at least one biometric sample 108, biometric identifier 102 stored on the international payment card 100, the cardholder's information 104, and/or any other component of the data structures 200 stored thereon. Card reader 120 is further configured for reading or writing to the international payment card 100 and in some embodiments for verifying the cardholder's pre-approval status for international payment transactions in a foreign country. Card reader 120 as exemplified herein may be adapted with electrical contacts 124' for establishing wired and/or wireless connectivity to international payment cards 100, 100', 100" and/or the computer 116 and transmits that international payment card number 126 to the computer 116, where the international payment card 100 is authenticated as a valid issued card. In some embodiments, a wireless connection may be established, wherein communication access is established with the computer 116 or the international payment card 100 in response to proximity or manual activation of the card reader 120. Card reader 120 may also be integrated within a computer 116 (e.g. with a slot for wired card connectivity), an external device (e.g., USB connection to a small housing), or be integrated into other devices.

The international payment cardholder's identity may also be verified via his/her biometric identifier 102, where the card reader 120 is configured to read the biometric identifier 102 stored on the international payment card 100 or the cardholder may be required to submit an in-person biometric sample 108 via the biometric verification means 110 positioned on the international payment card 100. In either event, biometric sample 108 is compared with the biometric identifier 102 stored on the international payment card 100. If the in-person biometric sample 108 matches the biometric identifier 102, the authentication results may be transmitted to the computer 116 via the card reader 120, and the computer 116 retrieves the cardholder's information stored on the computer's memory means 106 and authenticates the cardholder's identity. Accordingly, the retrieved cardholder's information 104 from the computer's memory means 106 can be compared for verifying the cardholder's authorization for an international transaction.

Computer 116, e.g. a network enabled computer 116, i.e. a laptop or personal digital assistant subject to wired/wireless connectivity and is configured with an application program 118 stored thereon to facilitate communications between the international payment card 100 and the computer 116 through the card reader 120.

Application program 118 may comprise in part of a browser, such as for use on a personal computer 116 or similar browsing device and comprises of computer executable instructions 114' executable by the computer's at least one processor 112", and operative to perform the system 300 and methods disclosed herein. Computer executable instructions 114" may be loaded directly on the computer's processor 112", or may be stored in computer's memory means 106', such as, but not limited to, computer readable media, such as, but not limited to, a hard drive, a solid state drive, a flash memory, random access memory, CD-ROM, CD-R, CD-RW, DVD-ROM, DVD-R, DVD-RW, and the like. The computer executable instructions 114" may be any type of computer executable instructions 114", which may be in the form of a computer program, the program being composed in any suitable programming language or source code, such as C++, C, JAVA, JavaScript, HTML, XML, and other programming languages.

Computer executable instructions 114" are operative to perform any one or more of the following: controlling the card reader 120 to read the international payment card 100; receiving a biometric sample 108 used to verify the cardholder's identity; comparing the biometric sample 108 with the biometric identifier 102 previously stored for the cardholder; updating the cardholder's location as verified by the absolute location 138 of the electronic card case 302 and/or the international payment card 100; or determining if the absolute location 138' of the electronic card case 302 is consistent with an absolute location 138 of the international payment card 100; authorizing use of the international payment card 100 abroad without further verification of cardholder's authority for payment transactions in a verified foreign country, e.g. confirmation by teleconference, if both absolute locations 138, 138' are consistent; or flagging the international payment card 100 for further verification of cardholder's identity because of inconsistent absolute locations 138, 138' for the electronic card case 302 and the international payment card 100. Using the system 300 disclosed herein, a cardholder seeking to use his/her international payment card 100 in a foreign country no longer needs to call the bank ahead of time to arrange for increased daily allowance or transaction limit as their locations in a foreign country are automatically updated with the system 300. If there is no discrepancies between the absolute locations 138, 138' cardholder's account is pre-authorized for foreign payment transactions in that country and will not be subject to a freeze.

As shown in FIG. 3, computer 116 is disposed in communication with memory means 106', i.e. illustratively an electronic database, configured for storing and maintaining information for the issued international payment cards 100, 100'. Memory means 106' may include a hardware component, e.g. storage hardware. Such storage hardware may include, but is not limited to, read-only memory, such as CD-ROMs, DVDs, floppy disks, and the like, read and write memory, such as a hard drive, floppy disc, CD-RW, DVD-RW, solid state memory, such as solid state hard drives, flash disks, and the like, and random access memory. In another embodiment, memory means 106' may include a software component, such as, but not limited to, an electronic database 318 as illustrated in FIG. 3, file management software, and any other software component as used in the arts. In yet another embodiment, memory means 106 may comprise of both hardware and software components.

Methods

Figure 4:
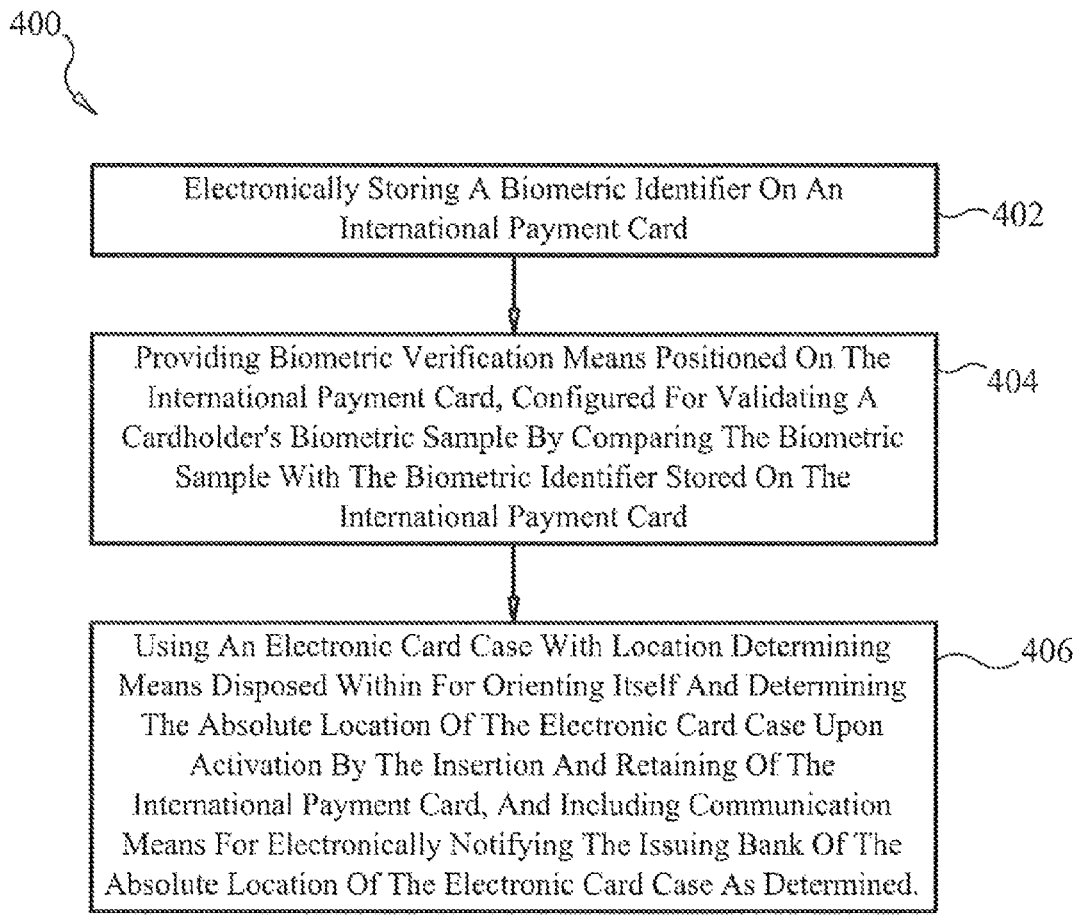
FIG. 4 is an exemplary method according to one embodiment of the invention.

FIG. 4 is an exemplary method 400 according to one embodiment of the invention. Method 400 comprises of electronically storing a biometric identifier 102 on an international payment card 100 (step 402) of the system 300 described herein. Biometric identifier 102 as used herein as used herein describes a stored biometric sample 108 that uniquely identifies the individual based on his/her intrinsic physical traits, e.g. fingerprints, retina scan, palm geometry, hand geometry, speech, and or other biometric identifiers 102, 102' that are used in the arts. International payment card 100 is selected from the group of electronic devices consisting essentially of programmable smart cards, memory cards, and processor cards, with at least one memory means 106 embedded therein configured for storing any one or more of the following: a biometric identifier 102 and/or the international payment cardholder's information 104. International payment card 100 is configured for being accessed by the application program 118 executable on the computer 116.

Method 400 further comprises of providing biometric verification means 110 positioned on the international payment card 100, where the biometric verification means is 110 configured for validating a cardholder's biometric sample 108 by comparing the biometric sample 108 with the biometric identifier 102 stored on the international payment card 100 (step 404). Biometric verification means 110 includes but is not limited to: fingerprint recognition means, hand geometry recognition means, palm geometry recognition means, iris recognition means, retina recognition means, speech recognition means and any other biometric verification means 110 that are known and used in the arts. Biometric verification means 110 may include at least one processor 112 positioned within the international payment card 100 and disposed in communication with, for example, a fingerprint scanner, hand geometry scanner, a palm geometry scanner, iris scanner, retina scanner, or a user interface which includes an audio receiving circuit capable of receiving audio signals at predetermined frequencies and/or with additional hardware complete with electronic circuitry and such other biometric verification means 110 that are known and used in the arts. In an exemplary embodiment, the biometric verification means 110 includes a fingerprint scanner, where the card's processor 112 controls the functionality of the fingerprint scanner, generating the varied algorithms for storage of the first valid biometric sample 108 as a biometric identifier 102 and validates the images of subsequent biometric samples 108, 108' received from the cardholder.

Method 400 further comprises of using an exemplary electronic card case 302, as shown in FIG. 3, which includes location determining means 136' disposed within, operative for orienting itself and determining the absolute location 138' of the electronic card case 302 upon activation by the insertion and retaining of the international payment card 100, and wherein the electronic card case 302 also comprises of communication means 304 for electronically notifying the issuing bank of the absolute location 138 of the electronic card case 302 as determined (step 406).

Electronic card case 302 describes an electronic device with location determining means 136 and communication means 304 in electronic communication with a processor 112' wherein the electronic card case's location determining means 136 is configured for determining the absolute locations 138, 138' of either the electronic card case 302 and/or the international payment card 100. In some embodiments, the electronic card case 302 also includes biometric verification means 110' positioned thereon for validating cardholder's identity with any one or more international payment cards 100, 100', 100" stored within.

Communication means 314' include both transmitting and receiving means, which may comprise of a combined wireless transceiver with integrated radio and shared antennae, e.g. WiHLoN™, ZIGBEE™, BLUETOOTH®, 802.11 series, or any other short range wireless protocol that is well known and used in the arts. Preferably, the communication means 304 include one or more combined wireless transceivers like a ZIGBEE™ and/or BLUETOOTH® transceiver with integrated radio and shared antennae wherein in some embodiments are in mating engagement with an autonomous power source, e.g. a rechargeable battery. Communication means 304 are operative for transmitting the location encoded signals 142, 142', that include the encoded absolute locations 138', 138 of the electronic card case 302 and/or the international payment card 100 to the issuing bank's remote computer 116, which updates the cardholder's location information for pre-authorization to use the international payment card 100 abroad.

In one aspect of the invention, card reader 120 is configured for reading the international payment card 100. Card reader 120 as shown in FIG. 3 describes an electronic device for scanning and reading electronic data cards like the international payment card 100, as are well known and used in the arts. Card reader 120 is connected to a computer 116 either wirelessly or wired, wherein card reader 120 is configured for scanning and reading any one or more of the following: the international payment card number 126, at least one biometric sample 108, biometric identifier 102 stored on the international payment card 100, the cardholder's information 104, and/or any other component of the data structures 200 stored thereon. Card reader 120, electronic card case 302 or international payment card 100 may provide the electronic notification to the issuing bank of the absolute location 138 of the international payment card 100. Card reader 120 is further configured for reading or writing to the international payment card 100 and in some embodiments for verifying the cardholder's pre-approval status for international payment transactions in a foreign country. Card reader 120 as exemplified herein may be adapted with electrical contacts 124' for establishing wired and/or wireless connectivity to international payment cards 100, 100', 100" and/or the computer 116. Alternatively, a wireless connection may be established, wherein communication access is established in response to proximity or manual activation of the card reader 120. Card reader 120 may also be integrated within a computer 116 (e.g. with a slot for wired card connectivity), an external device (e.g., USB connection to a small housing), or be integrated into other devices.

In one aspect of the invention, residing on the computer 116 is an application program 118 comprising of computer executable instructions 114' readable and executable by at least one computer processor 112' and configured for performing any one or more of the following: controlling the card reader 120 to read the international payment card 100; receiving a biometric sample 108 used to verify the cardholder's identity; comparing the biometric sample 108 with the biometric identifier 102 previously stored for the cardholder; updating the cardholder's location as verified by the absolute location 138 of the electronic card case 302 or the international payment card 100; or flagging the international payment card for further verification of cardholder's identity because of inconsistent absolute location 138 for the international payment card 100 and the absolute location 138 for the electronic card case 302.

Figure 5:
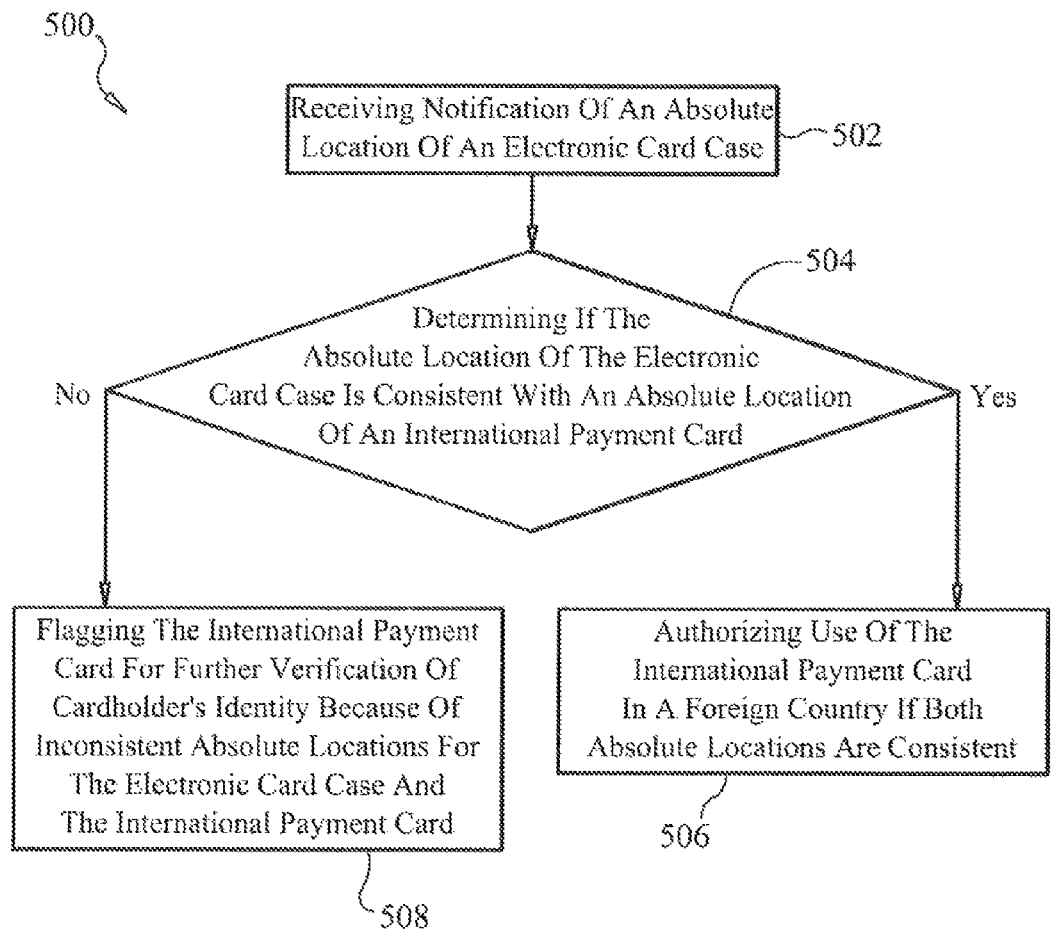
FIG. 5 is a sample flowchart of a block diagram of an exemplary method of the invention.

FIG. 5 is a sample flowchart of a block diagram of an exemplary method 500 of the invention. Method 500 comprises of receiving notification of an absolute location 138' of an electronic card case 302 (step 502) upon activation of its location determining means 136' that is disposed within the electronic card case 302 activated by the insertion and retaining of an international payment card 100 that includes a biometric identifier 102 received via the international payment card's biometric verification means 110 positioned thereon.

Method 500 further comprises of determining if the absolute location 138' of the electronic card case 302 is consistent with an absolute location 138 of the international payment card 100 (step 504) as stored on the system 300. In the event, the absolute location 138 of the international payment card 100 is the same as the electronic card case 302, the implication is that the international payment card 100 is with its rightful cardholder and as such satisfies the issuing bank's concern of unauthorized, fraudulent use of the international payment card 100. As such, method 500 comprises of authorizing use of the international payment card 100 in a foreign country for that verified foreign country if both absolute locations 138, 138' are consistent (step 506). In this manner, cardholder is preauthorized and may proceed with the financial transaction. However, it is understood that secondary verification may be required, e.g. an in-person verification of the cardholder's biometric sample 108 as matching the biometric identifier 102 stored thereon or with the issuing bank's computer, when the international payment card 100 is in use during the financial transaction.

If the absolute locations 138, 138' differ, method 500 comprises of flagging the international payment card 100 for further verification of cardholder's identity because of inconsistent absolute locations 138, 138' for the electronic card case 302 and the international payment card 100 (step 508).

In one aspect of the invention, the electronic notification of the international payment card 100 is done by the card reader 120 which may access the computer 116 by an application program 118 executable on a computer 116 comprising of computer executable instructions 114 executable by at least one computer processor 112 and configured for performing any one or more of the following: controlling the card reader 120 to read the international payment card 100; receiving a biometric sample 108 used to verify the cardholder's identity; comparing the biometric sample 108 with the biometric identifier 108 previously stored for the cardholder; or updating the cardholder's location as verified by the absolute location 138 of the electronic card case 302 and/or the international payment card 100.

Figure 6:
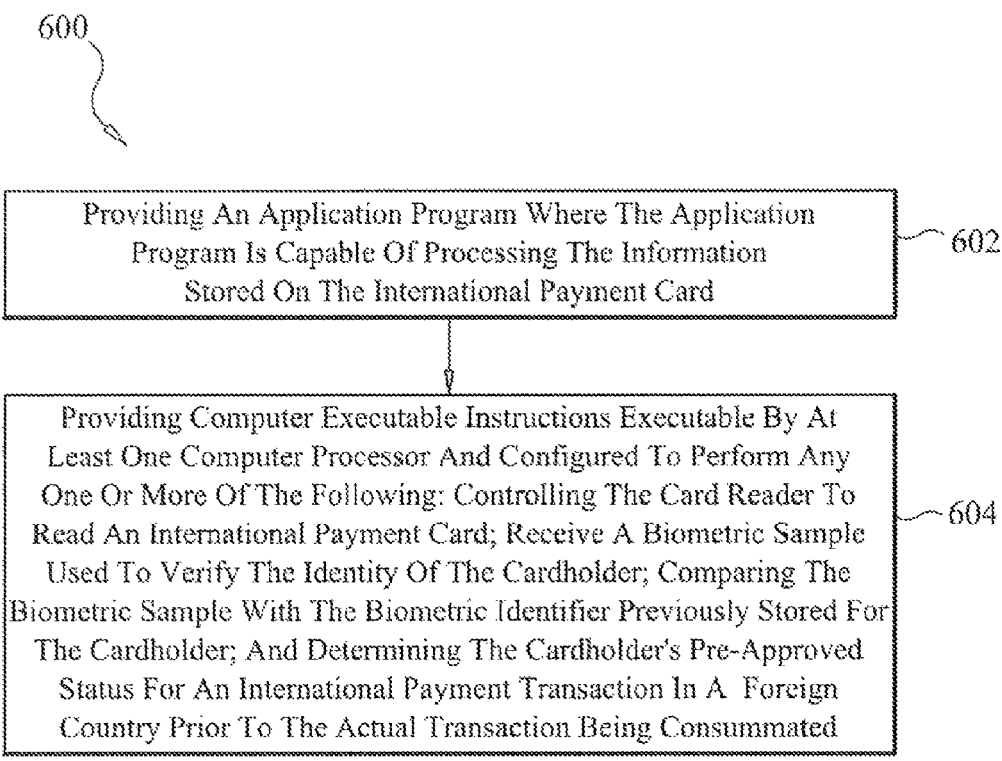
FIG. 6 is a sample flowchart of a block diagram of an exemplary method of the invention.

FIG. 6 is a sample flowchart of a block diagram of an exemplary method 600 of processing an international payment card 100 in accordance with an alternate embodiment. Method 600 comprises of providing an application program 118 (step 602) executable on a computer 116, where the application program 118 is capable of processing the information stored on the international payment card 100, i.e. a card number 126, biometric sample 108, biometric identifier 102, cardholder's information 104 and/or data structures 200 and the like.

Method 600 further comprises of providing computer executable instructions 114 (step 604) executable by at least one computer processor 112' and configured to perform any one or more of the following: controlling the card reader 120 to read an international payment card 100; receive a biometric sample 108 used to verify the identity of the cardholder; comparing the biometric sample 108 with the biometric identifier 102 previously stored for the cardholder; and determining the cardholder's pre-approved status for an international payment transaction in a foreign country prior to the actual transaction being consummated (step 604).

Hardware and Operating Environment

This section provides an overview of exemplary hardware and the operating environments in conjunction with which embodiments of the inventive subject matter can be implemented.

A software program may be launched from a computer readable medium in a computer-based system 300 to execute the functions defined in the software program. Various programming languages may be employed to create software programs designed to implement and perform the methods 400-600 disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 7 below.

Figure 7:
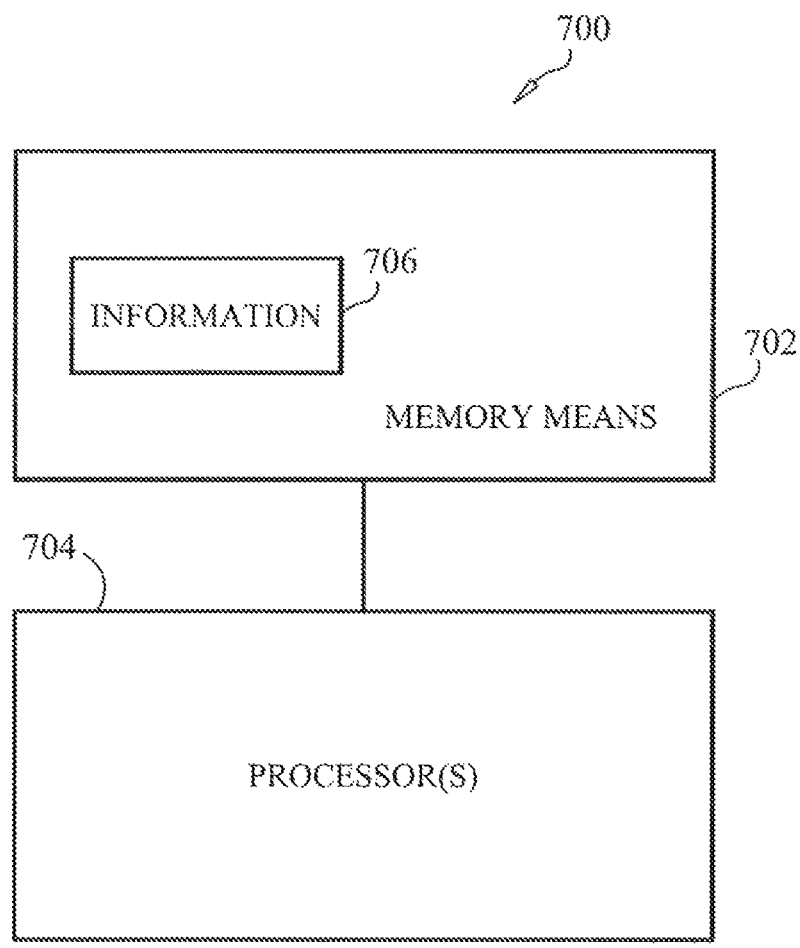
FIG. 7 is a block diagram representing an apparatus according to various embodiments.

FIG. 7 is a block diagram representing an apparatus 100 according to various embodiments. Such embodiments may comprise a computer; a memory means 702, a magnetic or optical disk, some other storage device, or any type of electronic device or system. The apparatus 700 may include one or more processor(s) 704 coupled to a machine-accessible medium such as memory means 702 (e.g., a memory including electrical, optical, or electromagnetic elements). The medium may contain associated information 706 (e.g., computer program instructions, data, or both) which, when accessed, results in a machine (e.g., the processor(s) 704) performing the activities previously described herein.

The principles of the present disclosure may be applied to all types of computers, systems, and the like, include desktop computers, servers, notebook computers, personal digital assistants, microcomputers, and the like. However, the present disclosure may not be limited to the personal computer.

While certain novel features of this invention have been shown and described and are pointed out in the annexed claims, it is not intended to be limited to the details above, since it will be understood that various omissions, modifications, substitutions and changes in the forms, method, steps and system illustrated and in its operation can be made by those skilled in the art without departing in any way from the spirit of the present invention.

What is claimed is:

1. A system comprising of:
   a payment card configured for electronically storing thereon a biometric identifier;
   biometric verification means positioned on the payment card, configured for validating a cardholder's biometric sample by comparing the biometric sample with the biometric identifier stored on the payment card; and
   an electronic card case, including location determining means disposed within, enabled for orienting and determining the absolute location of the electronic card case for pre-authorizing use of the payment card, and including communication means for electronically transmitting to the issuing bank, the absolute location of the electronic card case as determined for a proposed payment card transaction, authorizing use of the payment card before the payment card is read for payment for the card transaction.

2. The system of claim 1, further comprising of:
   a card reader for reading the payment card; and
   an application program executable on a computer comprising of computer executable instructions executable by at least one computer processor and configured for performing any one or more of the following:
   controlling the card reader to read the payment card;
   receiving a biometric sample used to verify the cardholder's identity;
   comparing the biometric sample with the biometric identifier previously stored for the cardholder;
   updating the cardholder's location as verified by the absolute location of the electronic card case or the payment card;
   authorizing use of the payment card for payment transactions in a foreign country; or
   flagging the payment card for further verification of cardholder's identity because of inconsistent absolute locations for the electronic card case and the payment card.

3. The system of claim 1, wherein the payment card is configured for being accessed by the application program executable on the computer.

4. The system of claim 1, wherein the biometric verification means includes but is not limited to: fingerprint recognition means, hand geometry recognition means, palm geometry recognition means, iris recognition means, retina recognition means, speech recognition means.

5. The system of claim 1, wherein the payment card is configured for communicating with the computer or card reader in any of the following manner: wirelessly or wired.

6. The system of claim 1, wherein the payment card is selected from the group of electronic devices comprising essentially of smart cards.

7. The system of claim 1, wherein the payment card includes memory means include any one or more of the following stored thereon: a biometric sample, biometric identifier, payment card's absolute location, or data structures.

8. The system of claim 1, wherein the electronic card case includes biometric verification means configured for validating a cardholder's identity.

9. The system of claim 8, wherein data structures includes but is not limited to: card number, security parameters, cardholder's information, issuing bank's information, cardholder's account information and global positioning system location information.

10. The system of claim 1, further comprising the electronic card case or the payment card notifying the issuing bank of the absolute location of the payment card.

11. A method comprising:
    electronically storing a biometric identifier on a payment card;
    providing biometric verification means positioned on the payment card, enabled for validating a cardholder's biometric sample by comparing the biometric sample with the biometric identifier stored on the payment card; and
    using an electronic card case with location determining means disposed within for orienting and determining the absolute location of the electronic card case for pre-authorizing use of the payment card, and including communication means for electronically transmitting to the issuing bank the absolute location of the electronic card case as determined for a proposed payment card transaction, authorizing use of the payment card before the payment card is read for payment for the card transaction.

12. The method of claim 11, further comprising of:
using a card reader for reading the payment card; and
using an application program executable on a computer comprising of computer executable instructions executable by at least one computer processor and configured for performing any one or more of the following:
controlling the card reader to read the payment card;
receiving a biometric sample used to verify the cardholder's identity;
comparing the biometric sample with the biometric identifier previously stored for the cardholder;
updating the cardholder's location as verified by the absolute location of the electronic card case or the payment card; or
flagging the payment card for further verification of cardholder's identity because of inconsistent absolute locations for the electronic card case and the payment card.

13. The method of claim 12, wherein the payment card is configured for being accessed by the application program executable on the computer.

14. The method of claim 11, wherein the biometric verification means includes but is not limited to: fingerprint recognition means, hand geometry recognition means, palm geometry recognition means, iris recognition means, retina recognition means, speech recognition means.

15. The method of claim 11, wherein the payment card is configured for communicating with the computer or card reader in any of the following manner: wirelessly or wired.

16. The method of claim 11, wherein the payment card is selected from the group of electronic devices comprising essentially of smart cards.

17. The method of claim 11, wherein the payment card includes memory means include any one or more of the following stored thereon: a biometric sample, biometric identifier, payment card's absolute location, or data structures.

18. The method of claim 11, wherein the electronic card case includes biometric verification means configured for validating a cardholder's identity.

19. The method of claim 18, wherein data structures includes but is not limited to: card number, security parameters, cardholder's information, issuing bank's information, cardholder's account information and global positioning system location information.

20. The method of claim 11, further comprising notifying the issuing bank of the absolute location of the payment card.

21. The method of claim 11, wherein the step of electronically notifying the issuing bank of the absolute location of the payment card is performed by any one or more of the following: the payment card, electronic card case or a card reader.

22. A method comprising:
receiving notification of an absolute location from location determining means of an electronic card case for a proposed payment card transaction;
determining if the absolute location of the electronic card case as determined by the location determining means is consistent with an absolute location of a payment card; and
pre-authorizing use of the payment card before the payment card is read for payment for the card transaction if both absolute locations are consistent.

23. The method of claim 22, further comprising of:
using a card reader for reading the payment card; or
using an application program executable on a computer comprising of computer executable instructions executable by at least one computer processor and configured for performing any one or more of the following:
controlling the card reader to read the payment card;
receiving a biometric sample used to verify the cardholder's identity;
comparing the biometric sample with the biometric identifier previously stored for the cardholder; or
updating the cardholder's location as verified by the absolute location of the electronic card case and/or the payment card.

24. The method of claim 23, wherein the payment card is configured for being accessed by the application program executable on the computer.

25. The method of claim 22, wherein the biometric verification means includes but is not limited to: fingerprint recognition means, hand geometry recognition means, palm geometry recognition means, iris recognition means, retina recognition means, speech recognition means.

26. The method of claim 22, wherein the payment card is configured for communicating with the computer or card reader in any of the following manner: wirelessly or wired.

27. The method of claim 22, further comprising flagging the payment card for further verification of cardholder's identity because of inconsistent absolute locations for the electronic card case and the payment card.

28. The method of claim 27, wherein the memory means may include any one or more of the following stored thereon: a biometric sample, biometric identifier, payment card's absolute location, or data structures.

29. The method of claim 28, wherein data structures includes but is not limited to: card number, security parameters, cardholder's information, issuing bank's information, cardholder's account information and glob al positioning system location information.

30. The method of claim 22, wherein the step of electronically notifying the issuing bank of the absolute location of the payment card is performed by any one or more of the following: the payment card, electronic card case or a card reader.

* * * * *